United States Patent
Nam

(10) Patent No.: US 12,500,428 B2
(45) Date of Patent: Dec. 16, 2025

(54) BATTERY CONTROL DEVICE AND SHORT-CIRCUIT DETECTION METHOD THEREOF

(71) Applicant: SAMSUNG SDI CO., LTD., Yongin-si (KR)

(72) Inventor: Hyungkyu Nam, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 491 days.

(21) Appl. No.: 17/458,939

(22) Filed: Aug. 27, 2021

(65) Prior Publication Data

US 2022/0102987 A1   Mar. 31, 2022

(30) Foreign Application Priority Data

Sep. 29, 2020   (KR) .......................... 10-2020-0127323

(51) Int. Cl.
   *H02J 7/00*   (2006.01)
(52) U.S. Cl.
   CPC .......... *H02J 7/0031* (2013.01); *H02J 7/0013* (2013.01); *H02J 7/0047* (2013.01); *H02J 7/00302* (2020.01); *H02J 7/00304* (2020.01); *H02J 7/00306* (2020.01)
(58) Field of Classification Search
   CPC .................................................... H02J 7/0031
   See application file for complete search history.

(56) References Cited

U.S. PATENT DOCUMENTS

| | | | |
|---|---|---|---|
| 8,081,410 B1* | 12/2011 | Wang .................... | H02J 7/0031 361/93.1 |
| 2012/0313560 A1 | 12/2012 | Hambitzer et al. | |
| 2012/0326531 A1* | 12/2012 | Kawamoto .......... | H02J 7/0031 307/130 |
| 2013/0026994 A1 | 1/2013 | Morikawa | |
| 2016/0252584 A1 | 9/2016 | Iwanaga et al. | |

(Continued)

FOREIGN PATENT DOCUMENTS

| | | |
|---|---|---|
| CN | 102742066 A | 10/2012 |
| CN | 204156508 U | 2/2015 |

(Continued)

OTHER PUBLICATIONS

Extended European Search Report dated Mar. 17, 2022, for corresponding European Patent Application No. 21193387.4.

(Continued)

*Primary Examiner* — Tynese V McDaniel
(74) *Attorney, Agent, or Firm* — Lee IP Law, P.C.

(57) ABSTRACT

A battery control device includes: a first battery control unit configured to control an electrical connection between an external load and a first battery module, the first battery control unit including: a first switch connected between a positive terminal for the first battery module and the external load; a second switch connected between a negative terminal for the first battery module and the external load; and a first controller configured to control an open/closed state of the first and second switches. The first controller may be configured to detect a short-circuit between the external load and the first battery control unit, according to a voltage between both ends of the first switch detected with the first switch open and the second switch closed.

14 Claims, 8 Drawing Sheets

(56) References Cited

U.S. PATENT DOCUMENTS

| | | | |
|---|---|---|---|
| 2018/0024196 A1* | 1/2018 | Imura | H02H 7/00 |
| | | | 324/762.01 |
| 2018/0152035 A1* | 5/2018 | Li | H02J 7/0031 |
| 2018/0233903 A1* | 8/2018 | Murakami | H03K 17/102 |
| 2020/0106082 A1 | 4/2020 | Fukushima et al. | |
| 2020/0381929 A1 | 12/2020 | Jin | |
| 2021/0028633 A1* | 1/2021 | Kanou | G01R 31/3277 |
| 2021/0197679 A1* | 7/2021 | Kouvo | B60L 53/14 |
| 2021/0376397 A1* | 12/2021 | Kawai | B60L 3/0046 |

FOREIGN PATENT DOCUMENTS

| | | |
|---|---|---|
| CN | 205562769 U | 9/2016 |
| CN | 206116547 U | 4/2017 |
| CN | 107894567 A | 4/2018 |
| CN | 111699603 A | 9/2020 |
| EP | 3 572 269 A1 | 11/2019 |
| JP | 2016-163410 A | 9/2016 |
| KR | 10-2016-0148933 A | 12/2016 |
| WO | WO 2019/009292 A1 | 1/2019 |
| WO | WO 2019/224102 A1 | 11/2019 |

OTHER PUBLICATIONS

Korean Office action dated Sep. 29, 2022.
Chinese Office Action dated Mar. 26, 2024, including a search report dated Mar. 23, 2024, for corresponding Chinese Patent Application No. 202111005662.4.

\* cited by examiner

BATTERY CONTROL DEVICE AND SHORT-CIRCUIT DETECTION METHOD THEREOF

CROSS-REFERENCE TO RELATED APPLICATION

This application claims priority to and the benefit of Korean Patent Application No. 10-2020-0127323 filed in the Korean Intellectual Property Office on Sep. 29, 2020, the entire contents of which are incorporated herein by reference.

BACKGROUND

1. Field

Embodiments relate to a battery control device and a short-circuit detection method thereof.

2. Description of the Related Art

An energy storage system (ESS) installed inside a container or building is a facility that instantly charges/discharges a large amount of power. Since such an ESS is a facility that handles large-capacity power, when applying it, it is important to ensure safety from installation to operation.

The above information disclosed in this Background section is only for enhancement of understanding of the background, and therefore it may contain information that does not form the prior art that is already known in this country to a person of ordinary skill in the art.

SUMMARY

Embodiments are directed to a battery control device, including: a first battery control unit configured to control an electrical connection between an external load and a first battery module, the first battery control unit including: a first switch connected between a positive terminal for the first battery module and the external load; a second switch connected between a negative terminal for the first battery module and the external load; and a first controller configured to control an open/closed state of the first and second switches. The first controller may be configured to detect a short-circuit between the external load and the first battery control unit, according to a voltage between both ends of the first switch detected with the first switch open and the second switch closed.

The battery control device may further include a connecting device connected to the first battery control unit, the connecting device including: a first main switch configured to electrically connect the first switch and a first terminal of the external load, and a second main switch configured to electrically connect the second switch and a second terminal of the external load.

The first controller may be configured to detect a short-circuit between the first battery control unit and the connecting device, according to the voltage between both ends of the first switch detected with the first switch open, the second switch closed, the first main switch open, and the second main switch open.

The first controller may be configured to detect a short-circuit between the connecting device and the external load according to the voltage between both ends of the first switch detected with the first switch open, the second switch closed, the first main switch closed, and the second main switch closed.

The battery control device may further include a second battery control unit connected between a second battery module and the connecting device and configured to control an electrical connection between the second battery module and the connecting device, the second battery control unit including: a third switch electrically connected between a positive terminal of the second battery module and the first main switch; a fourth switch electrically connected between a negative terminal of the second battery module and the second main switch; and a second controller configured to control an open/closed state of the third and fourth switches.

The second controller may be configured to detect a short-circuit between the second battery control unit and the connecting device, according to a voltage between both ends of the third switch detected with the third switch open, the fourth switch closed, the first main switch open, and the second main switch open.

The second controller may be configured to control the third and fourth switches to be open while the first controller detects a short-circuit, and the first controller may be configured to control the first and second switches to be open while the second controller detects a short-circuit.

Embodiments are also directed to a battery control device, including: a connecting device including a first main switch configured to electrically connect positive terminals of a plurality of battery modules with an external load, and a second main switch configured to electrically connect negative terminals of the plurality of battery modules and the external load; a plurality of battery control units respectively configured to control electrical connections between the plurality of battery modules and the first and second main switches; and a main controller configured to control an open/closed state of the first and second main switches. One of the plurality of battery control units may include: a first switch connected between a positive terminal of a corresponding battery module and the first main switch; a second switch connected between a negative terminal of the corresponding battery module and the second main switch; and a controller configured to control an open/closed state of the first and second switches. The controller may be configured to detect a short-circuit according to a voltage between both ends of the first switch detected with the first switch open, the second switch closed, the first main switch closed, and the second main switch closed.

The controller may be configured to determine that the short-circuit occurs when the voltage between both ends of the first switch detected with the first switch open, the second switch closed, the first main switch closed, and the second main switch closed is greater than 0 V.

The main controller may be configured to: detect an actual open/closed state of the first and second main switches, and determine that the first main switch or the second main switch is in a failure state when the actual open/closed state of the first main switch or the second main switch is the open state while a control signal that instructs switching to the closed state is output to the first and second main switches.

The controller may be configured to detect the short-circuit according to the voltage between both ends of the first switch with both the first and second main switches in a normal state.

The main controller may be configured to open the first and second main switches when it is determined that at least one of the first and second main switches is in the failure state.

The controller may be configured to transmit a state signal notifying occurrence of the short-circuit to the main controller when the short-circuit is detected, and the main controller may be configured to open the first and second main switches when the state signal notifying the occurrence of the short-circuit is received.

Embodiments are also directed to a short-circuit detection method of a battery control device, the method including: controlling a first main switch electrically connected between positive terminals of a plurality of battery modules and an external load to be in a closed state, and controlling a second main switch electrically connected between negative terminals of the plurality of battery modules and the external load to be in a closed state; in a first battery control unit controlling an electrical connection between a first battery module among the plurality of battery modules and the first and second main switches, controlling a second switch connected between a negative terminal of the first battery module and the second main switch to be in a closed state; detecting a voltage between first and second ends of a first switch, which is in an open state, the first switch being connected between a positive terminal of the first battery module and the first main switch; and detecting a first short-circuit between the first battery control unit and the external load according to the detected voltage between the first and second ends of the first switch.

The short-circuit detection method may further include: while controlling the first and second main switches to be in the closed state, detecting an actual open/closed state of the first and second main switches, and determining that the first main switch or the second main switch is in a failure state when the detected actual open/closed state of the first main switch or the second main switch indicates an open state; and when the first main switch or the second main switch is in the failure state, controlling the first and second main switches to be in an open state.

The detecting of the voltage between the first and second ends of the first switch and the detecting of the first short-circuit may both be performed when the first and second main switches are in a normal state.

The short-circuit detection method may further include, when the first short-circuit is detected: controlling the first and second main switches to be in an open state; and controlling the second switch to be in an open state.

The short-circuit detection method may further include, before the controlling of the first and second main switches to be in the closed state: maintaining the first and second main switches in an open state; and for each of a plurality of battery control units that respectively control an electrical connection between the plurality of battery modules and the first and second main switches, detecting a second short-circuit between a corresponding battery control unit of the plurality of battery control units and the first and second main switches. The detecting the second short-circuit between the corresponding battery control unit and the first and second main switches may include: controlling a fourth switch connected between a negative terminal of a corresponding battery module of the plurality of battery modules and the second main switch to be in a closed state; detecting a voltage between both ends of a third switch in an open state, the third switch being connected between a positive terminal of the corresponding battery module and the first main switch; and detecting the second short-circuit between the corresponding battery control unit and the first and second main switches according to the detected voltage between both ends of the third switch.

The detecting of the voltage between the first and second ends of the first switch and the detecting of the first short-circuit may be performed when the second short-circuit is not detected for all of the plurality of battery control units.

The first short-circuit may be a short-circuit between the first and second main switches and the external load.

BRIEF DESCRIPTION OF THE DRAWINGS

Features will become apparent to those of skill in the art by describing in detail example embodiments with reference to the attached drawings in which.

DETAILED DESCRIPTION

Figure 1:
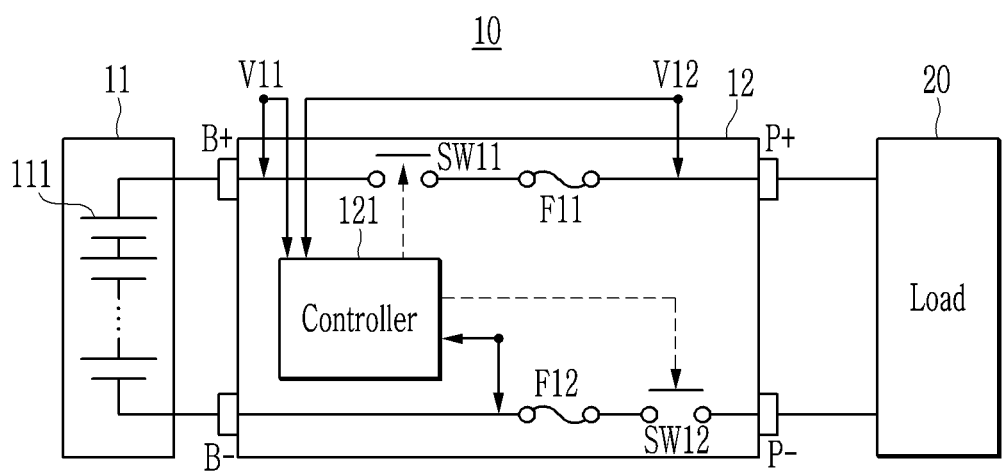
FIG. 1 schematically illustrates a battery system according to an example embodiment.

Example embodiments will now be described more fully hereinafter with reference to the accompanying drawings; however, they may be embodied in different forms and should not be construed as limited to the example embodiments set forth herein. Rather, these example embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

In the present specification, the term "and/or" includes all or random combinations of a plurality of items that are related and arranged. Regarding the description on an example embodiment, a singular term may include a plural form unless stated in another way.

Terms including ordinal numbers such as first, second, and the like will be used only to describe various components, and are not to be interpreted as limiting these components. The terms are only used to differentiate one component from other components. For example, a first constituent element could be termed a second constituent element, and similarly, a second constituent element could be termed a first constituent element, without departing from the scope.

Electrically connecting two constituent elements includes directly connecting two constituent elements and connecting the same with another constituent element therebetween. The other constituent element may include a switch, a resistor, and a capacitor. When the example embodiments are described, an expression of connection signifies electrical connection when an expression of direct connection is not provided.

FIG. 1 schematically illustrates a battery system according to an example embodiment.

Referring to FIG. 1, a battery system 10 according to an example embodiment may include a battery module 11 and a battery control device 12.

The battery module 11 may include a plurality of battery cells 111 electrically connected to each other in series or in parallel.

The battery control device 12 may detect state information such as a voltage, a current, and a temperature of the battery module 11, and may control a connection between the battery module 11 and an external device (e.g., a load 20, or a charging device (not shown)) based on the state information. The battery control device 12 may include a plurality of switches, e.g., a first switch SW11 and a second switch SW12, and a controller 121.

The first and second switches SW11 and SW12 may be respectively connected between positive and negative system terminals P+ and P− (which are electrically connected to the load 20 or the charging device), and between positive and negative terminals B+ and B− for respective positive and negative poles of the battery module 11 to electrically connect the battery module 11 and the positive and negative system terminals P+ and P− or to block an electrical connection between them. For example, the first switch SW11 may be electrically connected between the positive terminal B+ for the battery module 11 and the negative system terminal P+, and the second switch SW12 may be connected between the negative terminal B− for the battery module 11 and the negative system terminal P−. The first and second switches SW11 and SW12 may be relays, contactors, field effect switches (FET's), solid state switch (SSS's), or the like.

In order to monitor a state of the battery module 11, the controller 121 may acquire state information such as a voltage, a current, and a temperature related to the state of the battery module 11. In addition, the controller 121 may detect an overcharge or over-discharge state of the battery module 11 based on the state information of the battery module 11, and may control an open/closed state (or conductivity) of the first and second switches SW11 and SW12 based on the detected overcharge or over-discharge result. In addition, a function of detecting a short-circuit between the controller 121 and the positive and negative system terminals P+ and P− may be performed.

For example, a short-circuit condition to be detected by the controller 121 may be due to an abnormal short-circuit accident. The controller 121 may detect voltages V11 and V12 at respective ends of the first switch SW11 when the second switch SW12 is in a closed state (i.e., conductive state) and the first switch SW11 is in an open state (i.e., non-conductive state), and when the voltage between respective ends of the first switch SW11 calculated therefrom (e.g., |V11-V12|) is greater than 0 V (while the first switch SW11 is open and the second switch SW12 is closed), the controller 121 may determine that a short-circuit has occurred between the positive and negative system terminals P+ and P−. This will now be explained in further detail.

Figure 2A:
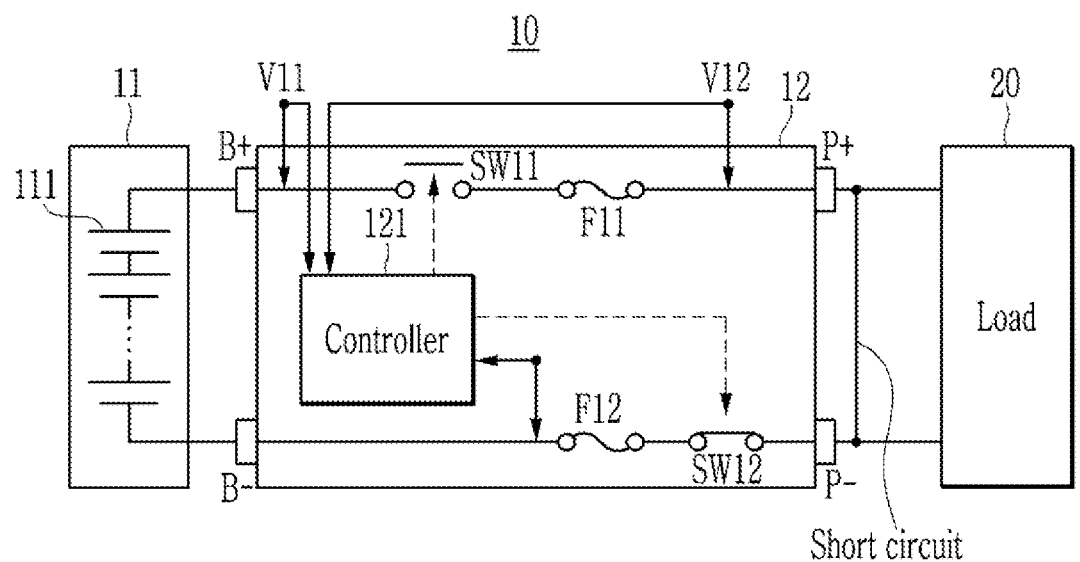
FIG. 2A and FIG. 2B illustrate cases in which a short-circuit accident occurs in the battery system of FIG. 1 as an example.
Figure 2B:
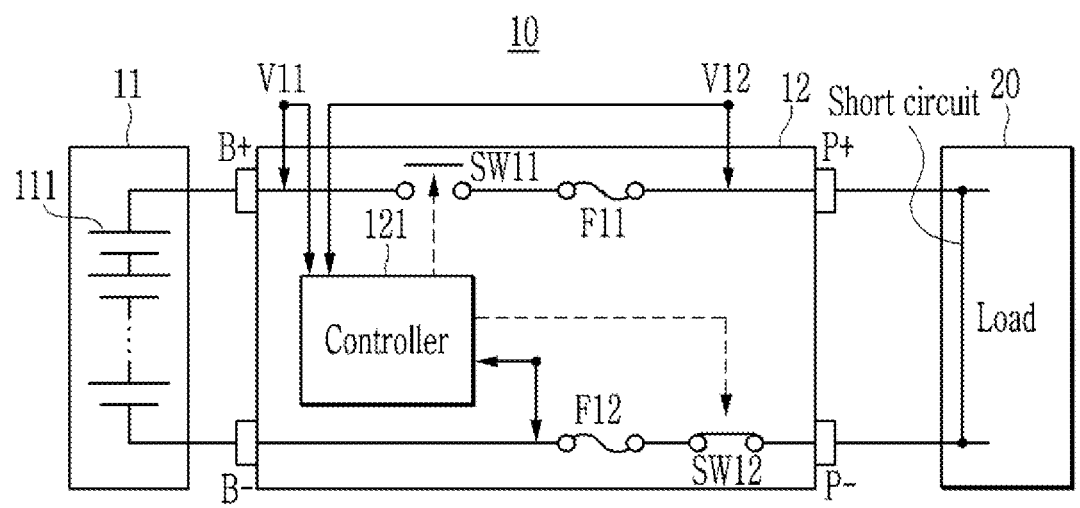

FIG. 2A and FIG. 2B illustrate two different example cases in which a short-circuit occurs outside the battery system 10 between the positive and negative system terminals P+ and P− (while the first switch SW11 is open and the second switch SW12 is closed). FIG. 2A illustrates a first case in which the positive and negative system terminals P+ and P− are short-circuited with each other due to a misconnection between the positive and negative system terminals P+ and P− and the load 20 resulting in the presence of a short-circuit between the positive and negative system terminals P+ and P−. FIG. 2B illustrates an example in which the positive and negative system terminals P+ and P− are short-circuited with each other due to a short-circuit inside the load 20.

Referring to FIG. 2A and FIG. 2B, when the first switch SW11 is open and the second switch SW12 is closed while the positive and negative system terminals P+ and P− are shorted to each other, the positive system terminal P+ is electrically connected to the negative terminal B− for the battery module 11 (via the short-circuit and the closed second switch SW12). Accordingly, one end of the first switch SW11 is connected to the positive terminal B+ for the battery module 11, and the other end of the (open) switch SW11 (i.e., the end at fuse F11, discussed below) is connected to the negative terminal B− for the battery module 11 (via the short-circuit and the closed second switch SW12). Thus, the voltage between both ends of the switch SW11 may be about equal to an output voltage of the battery module 11 (i.e., the voltage across the battery module terminals B+, B−), and thus greater than 0 V.

On the other hand, in a normal state when the positive and negative system terminals P+ and P− are not shorted to each other (as in FIG. 1) and the first switch SW11 is open and the switch second SW12 is closed, the positive system terminal P+ may be in a floating state, whereby one end of the first switch SW11 is connected to the positive terminal B+ for the battery module 11 and the other end of the first switch SW11 (i.e., the end at fuse F11, discussed below) is in a floating state. In this state, a voltage measuring circuit (not shown) inside the controller 121 may detect that the voltage between both ends of the switch SW11 is 0 V or about 0 V, or may determine that the voltage between both ends of the switch SW11 is in an unmeasurable state. Accordingly, in the state in which the second switch SW12 is closed in order to detect a short-circuit, when the voltage between both ends of the first switch SW11 (in the open state) is detected as 0 V or is detected as unmeasurable, the controller 121 may determine that the system is in a normal state in which a short-circuit between the positive and negative system terminals P+ and P− does not occur.

The controller 121 may perform the above-described short-circuit state detection function before an operation, e.g., before an initial operation, of the battery system 10, and when a short-circuit is detected through this, the controller 121 may control the first and second switches SW11 and SW12 to be in an open state, and may output a failure alarm or transmit a state signal warning of a short-circuit to an upper or higher-level system (not shown). On the other hand, when no short-circuit state is detected, the controller 121 may determine that a normal operation of the battery system 10 exists, and may allow for or control the switches SW11 and SW12 to be closed.

The battery control device 12 may further include at least one fuse to protect the battery module 11 from an overcurrent. Referring to FIG. 1 as an example, the battery control device 12 may further include the fuse F11 connected between the positive terminal B+ for the battery module 11 and the positive system terminal P+, and a fuse F12 connected between the negative terminal B− for the battery module 11 and the negative system terminal P−.

Figure 3:
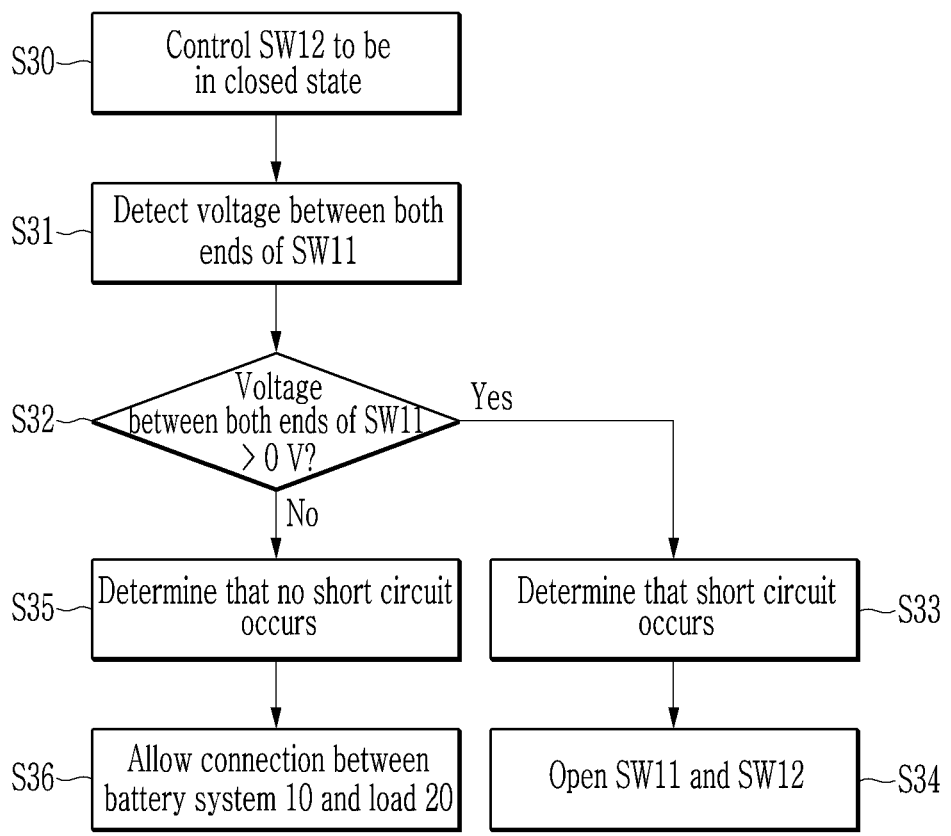
FIG. 3 schematically illustrates a short-circuit detection method of a battery system according to an example embodiment.

FIG. 3 schematically illustrates a short-circuit detection method of a battery system according to an example embodiment. The method of FIG. 3 may be performed by the battery control device 12 of the battery system 10 described with reference to FIG. 1.

Referring to FIG. 3, the battery control device 12, before operating the battery system 10, controls the first switch SW1 to be in the closed state through the controller 121 to detect a short-circuit condition of the positive and negative system terminals P+ and P−, that is, a short-circuit condition outside the battery system 10 (S30). The first and second switches SW11 and SW12 may be in an open state before starting of the battery system 10, and when the second switch SW12 is closed, the first switch SW11 maintains an open state. In this state, the controller 121 of the battery control device 12 detects the voltage between both ends of the first switch SW11 in the open state (S31).

When the voltage between both ends of the first switch SW11 detected through operation S31 is greater than 0 V (S32), the controller 121 determines that a short-circuit occurs outside of the battery system 10, that is, that the positive and negative system terminals P+ and P− are shorted to each other to form a closed circuit (S33)

As the short-circuit condition is detected, the controller 121 controls both of the first and second switches SW11 and SW12 to be in the open state (S34). In addition, the controller 121 may output a failure alarm or transmit a state signal warning that a short-circuit has occurred to the upper system.

Meanwhile, when the voltage between both ends of the first switch SW11 in operation S32 is not greater than 0 V, that is, when it is 0 V or an unmeasurable state, the controller 121 determines that a short-circuit does not occur between the positive and negative system terminals P+ and P− of the battery system 10 (S35). When it is determined that the short-circuit has not occurred, the controller 121 determines that the normal operation of the battery system 10 is possible and allows the connection between the battery system 10 and the load 20 (S36). Thus, the first and second switches SW11 and SW12 are allowed to be switched to be in the closed state.

In the above-described example embodiment, the battery system 10 including one battery module 11 is illustrated as an example, but the battery system 10 may include a plurality of battery modules.

Figure 4:
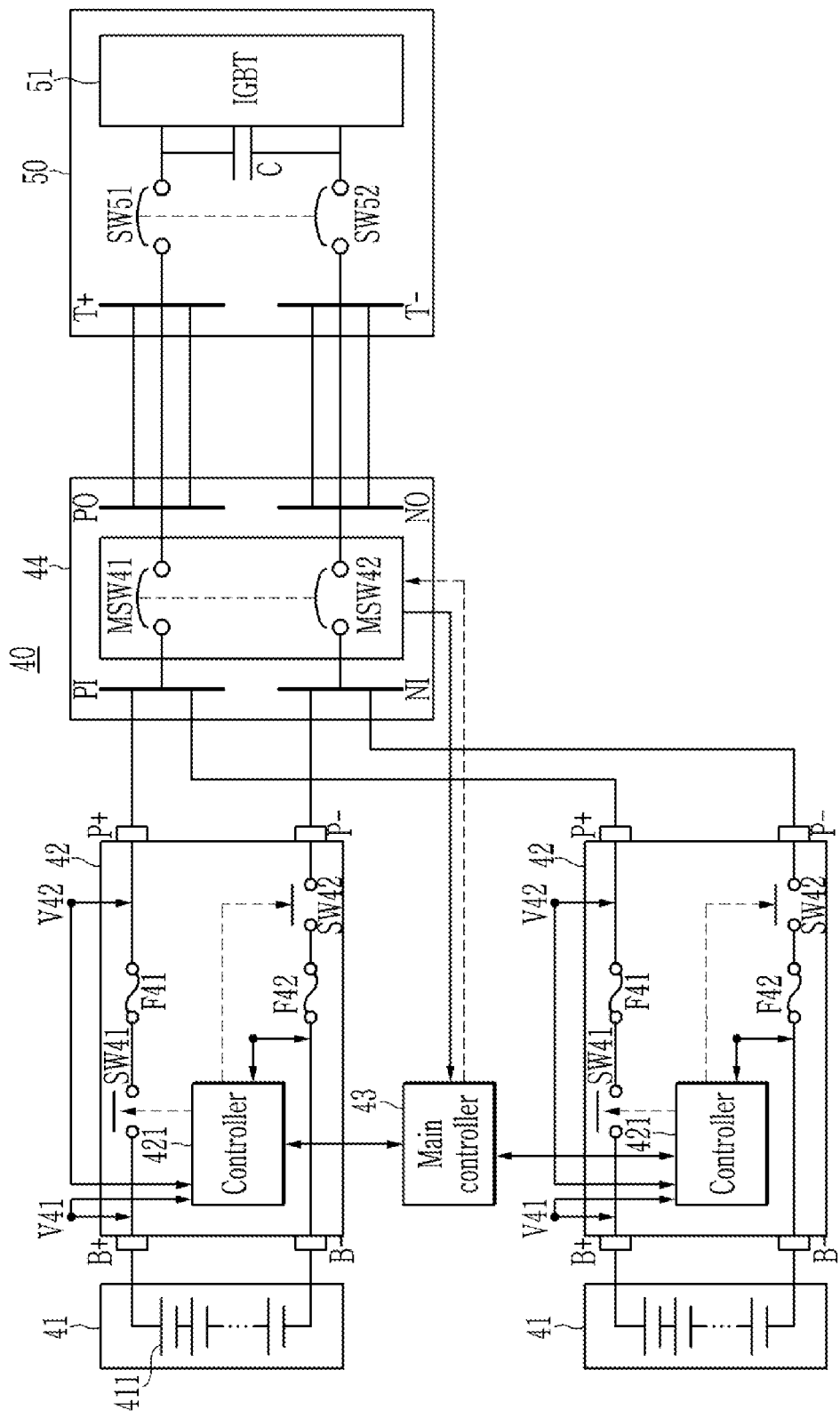
FIG. 4 schematically illustrates a battery system according to another example embodiment.

FIG. 4 schematically illustrates a battery system according to another example embodiment, wherein the battery system includes a plurality of battery modules that are connected to each other in parallel.

In FIG. 4, a battery system 40 may correspond to an energy storage system (ESS), and a load 50 connected to the battery system 40 may correspond to a power conditioning system (PCS). The load 50, e.g., a power conditioning system (PCS) may be a system that converts DC power supplied from the battery system 40, e.g., an energy storage system (ESS), into AC power to supply it to power consumers, and it may include a plurality of switches SW51 and SW52, a smoothing capacitor C, and an insulating gate bipolar transistor IGBT.

Referring to FIG. 4, the battery system 40 according to the present example embodiment may include a plurality of battery modules 41, and a battery control device for controlling connection between the plurality of battery modules 41 and the load 50. The battery control device may include a plurality of battery control units 42 respectively connected to the plurality of battery modules 41 to control connection for each battery module 41, a main controller 43, and a connecting device 44 connected between the plurality of battery control units 42 and the load 50 to control connection between the battery system 40 and the load 50.

Each battery module 41 may include a plurality of battery cells 411 electrically connected to each other in series or in parallel.

Each battery control unit 42 may detect state information such as a voltage, a current, and a temperature of the corresponding battery module 41, and may control the connection between the corresponding battery module 41 and the connecting device 44 based on this. Each battery control unit 42 may include a plurality of switches, e.g., first and second switches SW41 and SW42, and a controller 421.

The first and second switches SW41 and SW12 may be respectively connected between the positive and negative system terminals P+ and P− and between both terminals of the corresponding battery module 41 to electrically connect the corresponding battery module 41 and the positive and negative system terminals P+ and P− or to block an electrical connection between them. For example, the first switch SW41 may be electrically connected between a positive terminal B+ for the corresponding battery module 41 and the positive system terminal P+, and the second switch SW42 may be connected between a negative terminal B− for the corresponding battery module 41 and the negative system terminal P−. The first and second switches SW41 and SW42 may be relays, contactors, FETs, SSSs, or the like.

In order to monitor a state of the battery module 41, the controller 421 may acquire state information such as a voltage, a current, and a temperature related to the state of the battery module 41. In addition, the controller 421 may detect an overcharge or over-discharge state of the battery module 41 based on the state information of the battery module 41, and may control an open/closed state of the first and second switches SW41 and SW42 based on the detected overcharge or over-discharge result.

Each battery control unit 42 may further include at least one fuse to protect the corresponding battery module 41 from an overcurrent. Referring to FIG. 4 as an example, each battery control unit 42 may further include a fuse F41 connected between the positive terminal B+ for the corresponding battery module 41 and the positive system terminal P+, and a fuse F42 connected between the negative terminal B− for the corresponding battery module 41 and the negative system terminal P−.

The connecting device 44 may be disposed between the plurality of battery control units 42 and the load 50 to block or allow the connection between the plurality of battery control units 42 and the load 50. The connecting device 44 may include a plurality of input terminals PI and NI, a plurality of output terminals PO and NO, and a plurality of main switches, e.g., a first main switch MSW41 and a second main switch MSW42, connected between the plurality of input terminals PI and NI and the plurality of output terminals PO and NO.

The positive system terminals P+ of the battery control units 42 may be electrically connected to the positive input terminal PI, and the negative system terminals P− of the battery control units 42 may be electrically connected to the negative input terminal NI. The positive output terminal PO of the connecting device 44 may be electrically connected to a positive connector T+ of the load 50, and the negative output terminal NO of the connecting device 44 may be electrically connected to a negative connector T− of the load 50. The connecting device 44 may be implemented as a connecting device for configuring an electrical connection between equipments (the battery control unit 42 and the load 50) with a homopolar multi-line, and wires connected to respective input terminals PI and NI and respective output terminals PO and NO may be electrically combined to each other by a corresponding connector. Accordingly, the plurality of battery modules 41 may be connected in parallel to each other by the connecting device 44.

The first main switch MSW41 may be connected between the positive input terminal PI and the positive output terminal PO to electrically connect the positive input terminal PI and the positive output terminal PO or to block the connection between them. The second main switch MSW42 may be connected between the negative input terminal NI and the negative output terminal NO to electrically connect the negative input terminal NI and the negative output terminal NO or to block the connection between them. Opening/closing (or conductivity) of the first and second main switches MSW41 and MSW42 may be controlled by a control signal input from the main controller 43.

The main controller 43 may control the open/closed state of first and second main switches MSW41 and MSW42 included in the connecting device 44 to control the connection between the battery control units 42 and the load 50. Thus, the main controller 43 may control the supply of power from the battery system 40 to the load 50 by controlling the connection between the battery system 40 and the load 50 by controlling the open/closed state of the first and second main switches MSW41 and MSW42.

The main controller 43 may detect an actual open/closed state of the first and second main switches MSW41 and MSW42. The main controller 43 may compare the control signals output by the main controller 43 to the first and second main switches MSW41 and MSW42 with the actual open/closed states of the first and second main switches MSW41 and MSW42 to detect whether the main switches MSW41 and MSW42 are in a failure state. Thus, when the open/closed state indicated by the control signal output to the first and second main switches MSW41 and MSW42 is different from the actual open/closed state of the first and second main switches MSW41 and MSW42, the main controller 43 may determine that the first and second main switches MSW41 and MSW42 are in a failure state.

The main controller 43 may communicate with the controller 421 of each battery control unit 42. The main controller 43 may receive the state information of the corresponding battery module 41 or the open/closed state information of the corresponding first and second switches SW41 and SW42 from the controller 421 of each battery control unit 42 through communication. In addition, the main controller 43 may transmit the open/closed state information of the main switches MSW41 and MSW42 to the controller 421 of each battery control unit 42.

Each of the battery control units 42 may perform a function of detecting a short-circuit state between the positive and negative system terminals P+ and P− due to misconnection or the like in a similar manner to the battery control device 12 of FIG. 1. The short-circuit state detected by the battery control unit 42 is due to an abnormal short-circuit accident. When the switch second SW12 is in the closed state (or conducting state) and the first switch SW41 is in the open state (or non-conducting state), voltages V41 and V42 at both ends of the first switch SW41 are detected, and when the detected voltages V41 and V42 at both ends of the switch SW41 are greater than 0 V, the controller 421 may determine that a short-circuit has occurred between the positive and negative system terminals P+ and P−.

Figure 5A:
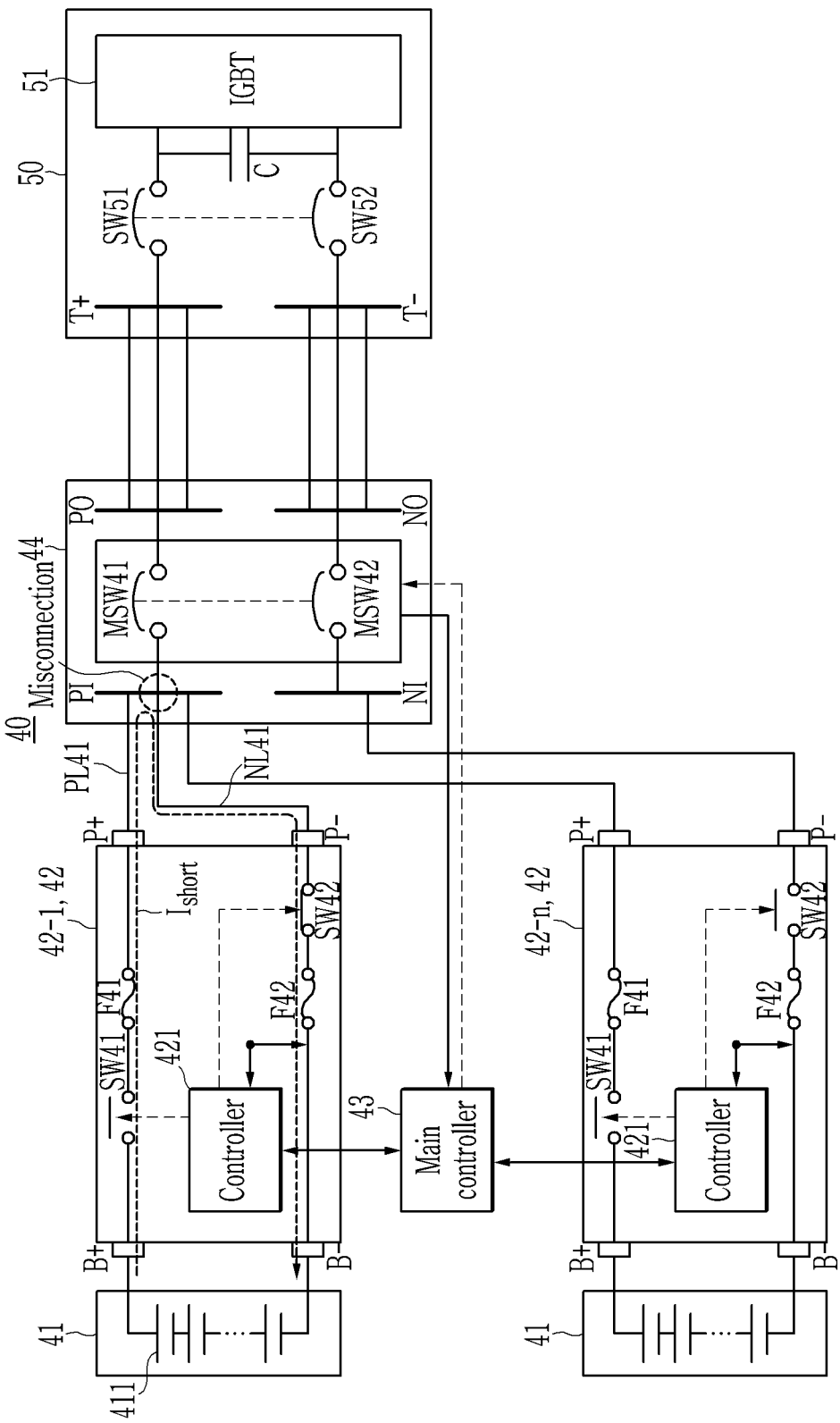
FIG. 5A and FIG. 5B illustrate cases in which a short-circuit accident occurs due to a misconnection in the battery system of FIG. 4 as an example.
Figure 5B:
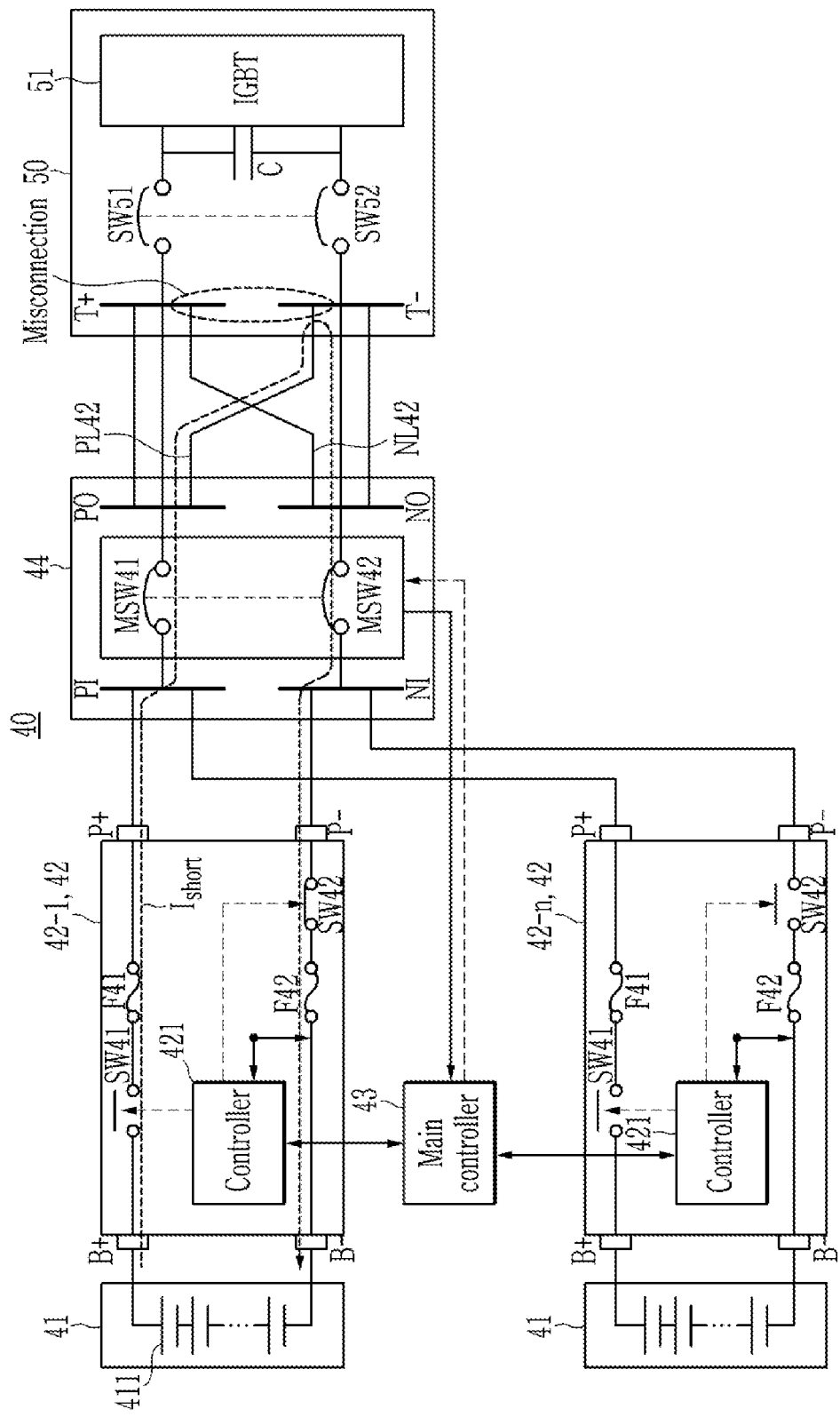

FIG. 5A and FIG. 5B illustrate example cases in which a short-circuit occurs between the positive and negative system terminals P+ and P− due to misconnection in the battery system 40 of FIG. 4. FIG. 5A illustrates a case in which the positive and negative system terminals P+ and P− are short-circuited to each other due to misconnection at the level of the battery control unit 42, that is, misconnection between the battery control unit 42 and the connecting device 44. FIG. 5B illustrates a case in which the positive and negative system terminals P+ and P− are short-circuited to each other due to misconnection at the level of the battery system 40, that is, misconnection between the connecting device 44 and the load 50.

In the example illustrated in FIG. 5A, a wire NL41 between a negative system terminal P− of a first battery control unit 42-1 and the connecting device 44 is misconnected, such that the positive and negative system terminals P+ and P− of the first battery control unit 42-1 are both connected to the positive input terminal PI of the connecting device 44. Accordingly, the positive and negative system terminals P+ and P− of the first battery control unit 42-1 are shorted to each other when the first and second switches SW41 and SW42 of the first battery control unit 42-1 are closed, a short-circuit current Ishort occurs.

In the example illustrated in FIG. 5B, a wire PL42 connected to the positive output terminal PO of the connecting device 44 is misconnected to the negative connector T− instead of the positive connector T+ of the load 50, and a wire NL42 connected to the negative output terminal NO is misconnected to the positive connector T+ of the load 50. Accordingly, the output terminals PO and NO of the connecting device 44 are short-circuited to each other when the first and second switches SW41 and SW42 of a battery control unit 42 are closed and the first and second main switches MSW41 and MSW42 are closed, and the short-circuit current Ishort occurs.

As shown in FIG. 5A, when a short-circuit occurs between the first battery control unit 42-1 and the connecting device 44 due to misconnection and the like, the first battery control unit 42-1 may detect the occurrence of the short-circuit by performing the above-described short-circuit detection function, regardless of the open/closed state of the main switches MSW41 and MSW42. Thus, the controller 421 of the first battery control unit 42-1 may measure the voltages V41 and V42 at both ends of the first switch SW41 in the open state (with the second switch SW12 in the closed state), thereby detecting occurrence of a short-circuit between the positive and negative system terminals P+ and P− of the first battery control unit 42-1.

As shown in FIG. 5B, when a short-circuit occurs between the connecting device 44 and the load 50 due to misconnection, any of the battery control units 42 may detect the occurrence of the short-circuit by performing the above-described short-circuit detection function when both of the first and second main switches MSW41 and MSW42 of the connecting device 44 are closed. Thus, the controller 421 of one of the battery control units 42, e.g., the first battery control unit 42-1, may control its second switch SW42 to be in the closed state while the first and second main switches MSW41 and MSW42 are both closed, and in this state, it may detect a short-circuit between its positive and negative system terminals P+ and P− by measuring the voltages V41 and V42 at both ends of its first switch SW41 while its first switch SW41 is in the open state.

Based on the above, a short-circuit occurs between the battery control units 42 and the connecting device 44 or between the connecting device 44 and the load 50, may be detected. For example, the battery system 40 may first sequentially perform the short-circuit state detection function for each battery control unit 42 while both of the first and second main switches MSW41 and MSW42 are in the open state, to thus check the connection state, that is, the short-circuit occurrence, between each of the battery control units 42 and the connecting device 44. Then, after confirming that all the connection states between the battery control units 42 and the connecting device 44 are all normal, both the main switches MSW41 and MSW42 may be closed, and in this state, the connection state between the connecting device 44 and the load 50 may be checked by performing the above-described short-circuit detection function in one of the battery control units 42.

The battery control units 42 may perform the above-described short-circuit state detection function before an operation, e.g., an initial operation, of the battery system 40, and when a short-circuit is detected through this, they may control the corresponding first and second switches SW41 and SW42 to be in an open state, and may transmit a state signal warning of this to the main controller 43. On the other hand, when no short-circuit state is detected by any of the battery control units 42, the battery control units 42 determine that a normal operation of the battery system 40 is possible and allow the corresponding switches SW41 and SW42 to be closed. In addition, a state signal notifying a normal state of the connections between the battery control units 42 and the connecting device 44, and the connection between the connecting device 44 and the load 50, may be transmitted to the main controller 43.

When the main controller 43 receives a state signal indicating the occurrence of a short-circuit from at least one battery control unit 42, the main controller 43 may separate the battery system 40 from the load 50 by controlling the first and second main switches MSW41 and MSW42 to be in an open state. In addition, the main controller 43 may output a failure alarm or notify the failure occurrence to a higher-level system (not shown) or an administrator terminal (not shown). On the other hand, when the state signals indicating that the states of the connections between all the battery control units 42 and the connecting device 44, and of the connection between the connecting device 44 and the load 50, are normal are received, the main controller 43 may determine that the normal operation of the battery system 40 is possible and allows closing of the first and second main switches MSW41 and MSW42.

Figure 6A:
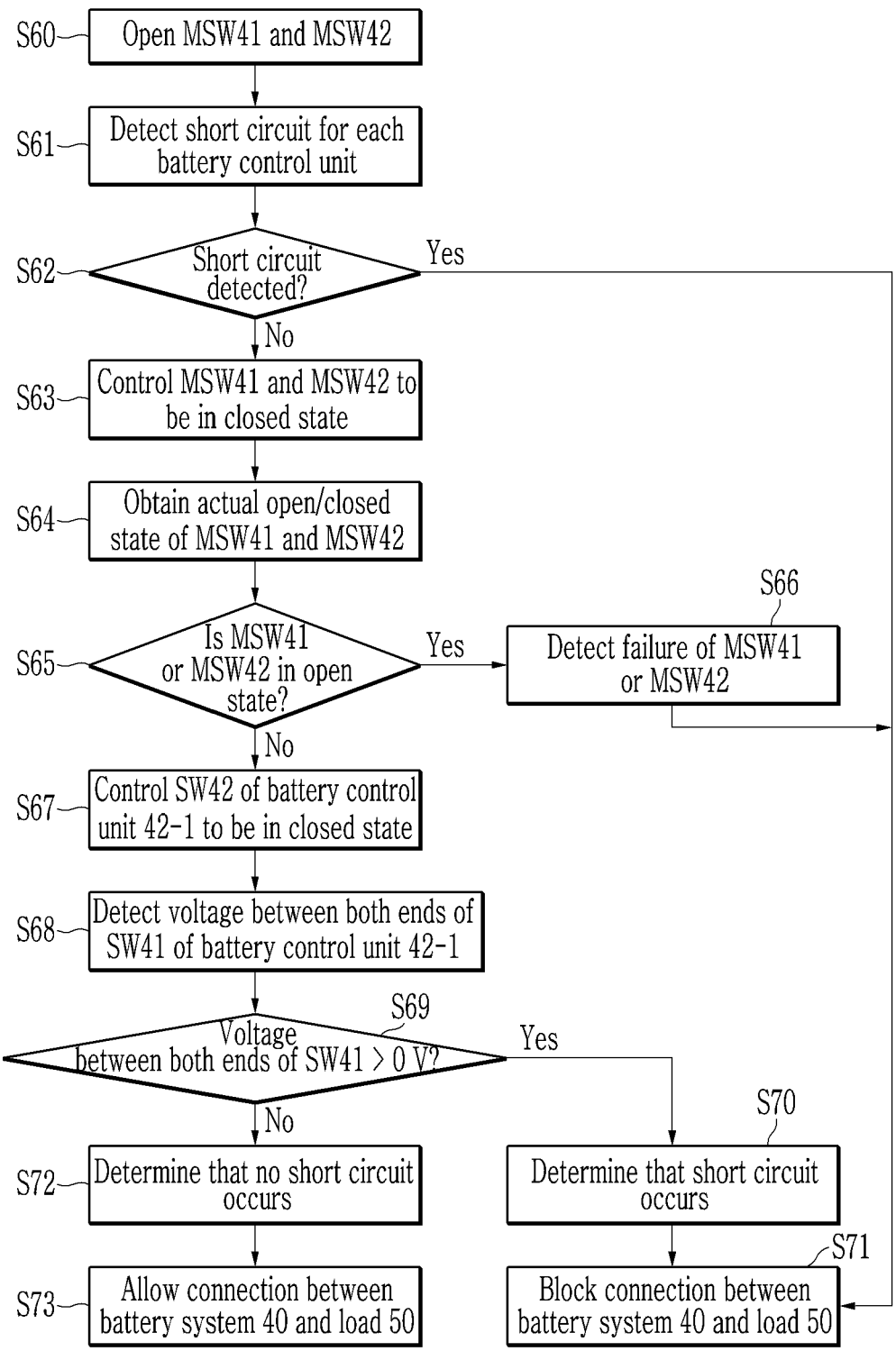
FIG. 6A and FIG. 6B schematically illustrate a short-circuit detection method of a battery system according to another example embodiment.
Figure 6B:
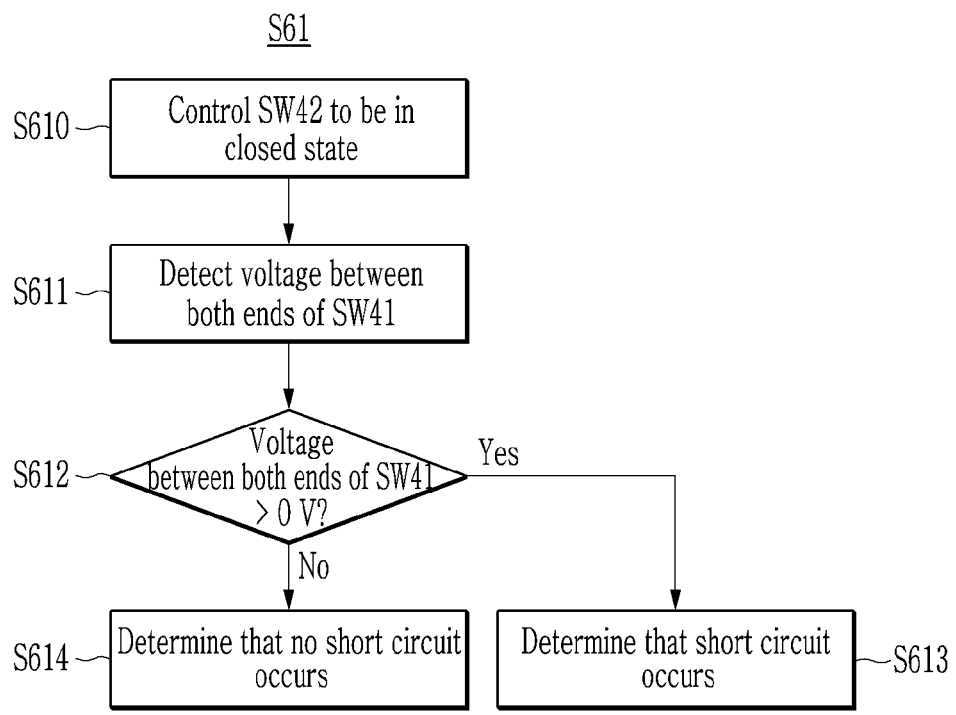

FIG. 6A and FIG. 6B schematically illustrate a short-circuit detection method of a battery system according to an example embodiment. The method of FIG. 6A and FIG. 6B may be performed by the battery control device of the battery system 40 described with reference to FIG. 4.

Referring to FIG. 6A, in order to detect a short-circuit in a level of the battery control unit 42 before an operation of the battery system 40, the battery control device maintains the first and second main switches MSW41 and MSW42 in an open state (S60), and in this state, it sequentially performs short-circuit detection for each battery control unit 42 (S61).

FIG. 6B specifically illustrates a method of performing the short-circuit detection at the level of the battery control unit 42 in each battery control unit 42 in operation S61.

Referring to FIG. 6B, the controller 421 of each battery control unit 42 controls the second switch SW42 to be in a closed state through the controller 421 in order to detect occurrence of a short-circuit between the battery control unit 42 and the connecting device 44 (S610). In this case, the first switch SW41 of the corresponding battery control unit 42 maintains an open state, and the controller 421 detects a voltage between both ends of the first switch SW41 of the open state (S611).

When the voltage between both ends of the first switch SW41 detected through operation S611 is greater than 0 V (S612), the controller 421 determines that a short-circuit occurs between the corresponding battery control unit 42 and the connecting device 44 to form a closed circuit, e.g., the controller determines that the positive and negative system terminals P+ and P− have been shorted to each other (S613). As the short-circuit is detected, the controller 421 may transmit a state signal, indicating that the short-circuit has occurred between the corresponding battery control unit 42 and the connecting device 44, to the main controller 43.

Meanwhile, when the voltage between both ends of the first switch SW41 in operation S612 is not greater than 0 V, that is, when it is 0 V or an unmeasurable state, the controller 421 determines that no short-circuit occurs between the corresponding battery control unit 42 and the connecting device 44 (S614). When it is determined that no short-circuit occurs, the controller 421 may transmit a state signal, indicating that the connection between the corresponding battery control unit 42 and the connecting device 44 is in a normal state, to the main controller 43.

Each battery control unit 42 may detect occurrence of a short-circuit between the corresponding battery control unit 42 and the connecting device 44 by performing operation S610 to operation S613 described above. On the other hand, while one battery control unit 42 detects the short-circuit through operation S601 to operation S613 described above, the remaining battery control units 42 remain disconnected from the connecting device 44 in order to not affect the detection result (that is, the switches SW41 and SW42 are open).

Referring back to FIG. 6A, when no short-circuits between the battery control units 42 and the connecting device 44 are detected in operation S61 described above (S62), the main controller 43 then controls the first and second main switches MSW41 and MSW42 to be in a closed state (S63) in order to detect the occurrence of a short-circuit in the battery system 40, that is, the occurrence of a short-circuit between the connecting device 44 and the load 50. Thus, control signals instructing switching to a closed state may be output to the first and second main switches MSW41 and MSW42.

In this state, the main controller 43 obtains an actual open/closed state of the first and second main switches MSW41 and MSW42 from the connecting device 44 (S64), and based on this, it first determines whether the first and second main switches MSW41 and MSW42 are in a failure state. Thus, in the state in which the control signals instructing the switching of the closed state are output to the first and second main switches MSW41 and MSW42, when the detected actual open/closed state of the first and second main switches MSW41 and MSW42 indicates that the first main switch MSW41 or the second main switch MSW42 is in an open state (S65), the main controller 43 detects that the main switch MSW41 or the main switch MSW42 is in a failure state (S66). On the other hand, when both the first and second main switches MSW41 and MSW42 are in the closed state (S65), it is determined that both the first and second main switches MSW41 and MSW42 are normally operating, i.e., are each in a normal state, and a process of detecting the short-circuit between the connecting device 44 and the load 50 is performed.

Thus, the main controller 43 instructs the controller 421 of one of the battery control units 42 (for example, the first battery control unit 42-1 of FIG. 5B) to detect a short-circuit, and the controller 421 receiving this controls the corresponding second switch SW42 to be in a closed state (S67). In this case, the first switch SW41 of the corresponding battery control unit 42-1 maintains an open state, and the controller 421 detects a voltage between both ends of the first switch SW41 while the first switch SW41 is in the open state (S68).

When the voltage between both ends of the first switch SW41 detected through operation S68 is greater than 0 V (S69), the controller 421 determines that a short-circuit occurs between the corresponding connecting device 44 and the load 50 to form a closed circuit, e.g., the controller 421 determines that the positive and negative system terminals P+ and P− are shorted to each other (S70). Meanwhile, when the voltage between both ends of the switch SW41 in operation S69 is not greater than 0 V, that is, when it is 0 V or an unmeasurable state, the controller 421 determines that a short-circuit does not occur between the connecting device 44 and the load 50 (S72).

When the short-circuit is detected between the at least one battery control unit 42 and the connecting device 44 through the above-described operation S62, when the failure of at least one of the main switches MSW41 and MSW42 is detected in the above-described operation S65, or when the short-circuit between the connecting device 44 and the load 50 is detected through the above-described operation S69, the main controller 43 may instruct each controller 421 to release the connection between each battery control unit 42 and the connecting device 44, that is, to open the switches first and second SW41 and SW42, and may block the connection between the battery system 40 and the load 50 by opening the first and second main switches MSW41 and MSW42 (S71).

On the other hand, when no short-circuit is detected and failure of the main switches MSW41 and MSW42 is not detected, the main controller 43 instructs each controller 421 to allow the closed state of the first and second switches SW41 and SW42, and allows the connection between the battery system 40 and the load by allowing the closed state of the first and second main switches MSW41 and MSW42 (S73).

According to the above-described example embodiments, before the battery systems 10 and 40 are operated as the power source of the loads 20 and 50, the short-circuit state caused by misconnection inside or outside the battery systems 10 and 40 may be detected. Therefore, it may be possible to detect the short-circuit state and take appropriate measures before the components of the battery systems 10 and 40 are damaged due to the short-circuit current, thereby preventing the damage of the components and consequent replacement costs, and increasing the lifespan of the battery systems 10 and 40. In addition, such a short-circuit detection procedure may be automatically performed by the battery systems 10 and 40, so that human error, e.g., due to inexperience of the administrator, may be avoided, and the detection time may be shortened, thereby further improving safety and efficiency of the system.

Electronic or electrical devices according to example embodiments and/or other related devices or constituent elements may be realized by using appropriate hardware, firmware (e.g., an application-specific integrated circuit), software, or combinations of software, firmware, and hardware. For example, various configurations of the above-noted devices may be positioned on one integrated circuit (IC) chip or an individual IC chip. In addition, various configurations of the above-noted devices may be realized on a flexible printed circuit film, a tape carrier package (TCP), a printed circuit board (PCB), or one substrate. The electrical or mutual connections described in the present specification may, for example, be realized by the PCB, wires on different types of circuit carriers, or conductive elements. The conductive elements may, for example, include metallization such as surface metallizations and/or pins, and may include conductive polymers or ceramics.

In addition, the various configurations of the devices may be implemented by at least one processor so as to perform the above-described various functions, they may be performed in at least one computing device, and they may be processes or threads for performing computer program instructions and interacting with other system constituent elements. The computer program instruction may be stored in a memory realizable in a computing device using a standard memory device such as a random access memory (RAM). The computer program instruction may also be stored in a non-transitory computer readable medium such as a CD-ROM or a flash drive.

By way of summation and review, if a cable of a power conditioning system is misconnected due to a human error during an ESS installation, various protective functions are desirable to prevent accidents such as electric shock, short-circuit, and fire. A representative protective function may include a misconnection monitoring function. Generally, a misconnection monitoring function may be performed in the following two methods.

A first method is a method in which, after installation of a facility is completed, a manager checks a resistance value of the installed cables with a resistance measuring instrument to check whether a short-circuit is formed, and then if the short-circuit is confirmed, it is determined that misconnection has occurred, and the facility is reconstructed. In this case, there is a possibility that a human error may occur in the process of the manager checking whether there is the misconnection with the resistance measuring instrument.

A second method is a method in which a fuse is installed inside a control box to protect a battery from a short-circuit accident caused by misconnection of a cable, and when a short-circuit accident occurs due to a short-circuit formation during a system operation, the fuse blocks a short-circuit current to protect the system. In this case, various problems may result from the short-circuit when the system is operated. For example, when a fuse blows, time and money may be expended to find the cause of blowing the fuse. The fuse may blow due to various accidents that cause short-circuit currents. However, the fuse itself has only a function of blocking the short-circuit current, and thus does not provide any function for checking the cause of the short-circuit current. The checking of the cause of the short-circuit current to eliminate the failure is performed in a way in which an operator directly checks all possible conditions for the short-circuit current to occur. As another example, since occurrence of the short-circuit current is detected while the system is in operation, when blowing of the fuse is delayed in a short-circuit condition, the system may be exposed to a high short-circuit current for some time, and thus accidents such as component damage, explosion, and insulation breakdown may occur. As another example, in order to identify the cause of a blown fuse and restart the system, recovery costs, such as a cost of replacement of materials to replace the blown fuse, may be incurred.

As described above, embodiments may provide a battery control device and a short-circuit detection method thereof that may accurately detect whether a short-circuit occurs, due to misconnection or the like, prior to an operation of a battery system.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

DESCRIPTION OF SYMBOLS 10, 40: battery systems
11, 41: battery modules
111, 411: battery cells
12: battery control device
121: controller
20, 50: loads
42, 42-1: battery control units
421: controller
43: main controller
44: connecting device
F11, F12, F41, F42: fuses
SW11, SW12, SW41, SW42: switches
MSW41, MSW42: main switches
B+, B−: battery module terminals
P+, P−: system terminals
PI, NI: input terminals of connecting device
PO, NO: output terminals of connecting device

What is claimed is:

1. A battery control device, comprising:
a main controller;
a first battery control unit configured to control an electrical connection between an external load and a first battery module, the first battery control unit including:
a first switch connected between a positive terminal for the first battery module and the external load;
a first fuse connected to one end of the first switch;
a second switch connected between a negative terminal for the first battery module and the external load;
a second fuse connected to one end of the second switch; and
a first controller separate from the main controller and a second controller, the first controller being in communication with the main controller and configured to control an open/closed state of the first and second switches,
a connecting device connected to the first battery control unit, the connecting device including:
a first main switch configured to electrically connect the first switch and a first terminal of the external load, and
a second main switch configured to electrically connect the second switch and a second terminal of the external load,
a second battery control unit connected between a second battery module and the connecting device and configured to control an electrical connection between the second battery module and the connecting device, the second battery control unit including:
a third switch electrically connected between a positive terminal of the second battery module and the first main switch;
a third fuse connected to one end of the third switch;
a fourth switch electrically connected between a negative terminal of the second battery module and the second main switch;
a fourth fuse connected to one end of the fourth switch;

wherein the second controller is separate from the first controller and the main controller, the second controller being in communication with the main controller and configured to control an open/closed state of the third and fourth switches,
wherein the main controller is configured to:
detect an actual open/closed state of the first and second main switches, and
determine that the first main switch or the second main switch is in a failure state when the actual open/closed state of the first main switch or the second main switch is the open state while a control signal that instructs switching to the closed state is output to the first and second main switches,
wherein the first controller is configured to detect a short-circuit between the external load and the first battery control unit, according to a voltage between both ends of the first switch detected with the first switch open and the second switch closed,
wherein the second controller is configured to detect a short-circuit between the second battery control unit and the connecting device, according to a voltage between both ends of the third switch detected with the third switch open, the fourth switch closed, the first main switch open, and the second main switch open,
and wherein:
the second controller is configured to control the third and fourth switches to be open while the first controller detects a short-circuit,
the first controller is configured to control the first and second switches to be open while the second controller detects a short-circuit, and
detecting a short-circuit among the first controller and the second controller is sequential.

2. The battery control device as claimed in claim 1, wherein the first controller is configured to detect a short-circuit between the first battery control unit and the connecting device, according to the voltage between both ends of the first switch detected with the first switch open, the second switch closed, the first main switch open, and the second main switch open.

3. The battery control device as claimed in claim 1, wherein the first controller is configured to detect a short-circuit between the connecting device and the external load according to the voltage between both ends of the first switch detected with the first switch open, the second switch closed, the first main switch closed, and the second main switch closed.

4. A battery control device, comprising:
a connecting device including a first main switch configured to electrically connect positive terminals of a plurality of battery modules with an external load, and a second main switch configured to electrically connect negative terminals of the plurality of battery modules and the external load;
a plurality of battery control units respectively configured to control electrical connections between the plurality of battery modules and the first and second main switches; and
a main controller configured to:
control an open/closed state of the first and second main switches,
detect an actual open/closed state of the first and second main switches, and
determine that the first main switch or the second main switch is in a failure state when the actual open/closed state of the first main switch or the second main switch is the open state while a control signal that instructs switching to the closed state is output to the first and second main switches, wherein each of the plurality of battery control units includes:
a first switch connected between a positive terminal of a corresponding battery module and the first main switch;
a first fuse connected to one end of the first switch;
a second switch connected between a negative terminal of the corresponding battery module and the second main switch;
a second fuse connected to one end of the second switch;
a controller configured to control an open/closed state of the first and second switches, wherein the controller of one battery control unit of the plurality of battery control units is configured to detect a short-circuit between the one battery control unit and the external load according to a voltage between both ends of the first switch detected with the first switch open, the second switch closed, the first main switch closed, and the second main switch closed, and wherein each controller is further configured to sequentially detect a short-circuit among the plurality of battery control units according to a voltage between both ends of the corresponding first switch detected with the corresponding first switch open, the corresponding second switch closed, the first main switch open, and the second main switch open.

5. The battery control device as claimed in claim 4, wherein each controller is configured to determine that the short-circuit occurs when the voltage between both ends of the corresponding first switch detected with the corresponding first switch open, the corresponding second switch closed, the first main switch closed, and the second main switch closed is greater than 0 V.

6. The battery control device as claimed in claim 4, wherein each controller is configured to detect the short-circuit according to the voltage between both ends of the corresponding first switch with both the first and second main switches in a normal state.

7. The battery control device as claimed in claim 4, wherein the main controller is configured to open the first and second main switches when it is determined that at least one of the first and second main switches is in the failure state.

8. The battery control device as claimed in claim 4, wherein:
each controller is configured to transmit a state signal notifying occurrence of the short-circuit to the main controller when the short-circuit is detected, and
the main controller is configured to open the first and second main switches when the state signal notifying the occurrence of the short-circuit is received.

9. A short-circuit detection method of a battery control device, the method comprising:
controlling, by a main controller, a first main switch electrically connected between positive terminals of a plurality of battery modules and an external load to be in a closed state, and controlling, by the main controller, a second main switch electrically connected between negative terminals of the plurality of battery modules and the external load to be in a closed state;
in a first battery control unit controlling an electrical connection between a first battery module among the plurality of battery modules and the first and second main switches, controlling a second switch connected between a negative terminal of the first battery module and the second main switch to be in a closed state;
detecting a voltage between first and second ends of a first switch, which is in an open state, the first switch being connected between a positive terminal of the first battery module and the first main switch;
detecting a first short-circuit between the first battery control unit and the external load according to the detected voltage between the first and second ends of the first switch;
before the controlling of the first and second main switches to be in the closed state:
maintaining, by the main controller, the first and second main switches in an open state;
for each of a plurality of battery control units that respectively control an electrical connection between the plurality of battery modules and the first and second main switches, sequentially detecting a second short-circuit between a corresponding battery control unit of the plurality of battery control units and the first and second main switches;
detecting, by the main controller, an actual open/closed state of the first and second main switches; and
determining, by the main controller, that the first main switch or the second main switch is in a failure state when the actual open/closed state of the first main switch or the second main switch is the open state while a control signal that instructs switching to the closed state is output to the first and second main switches,
wherein the detecting the second short-circuit between the corresponding battery control unit and the first and second main switches includes:
controlling a fourth switch connected between a negative terminal of a corresponding battery module of the plurality of battery modules and the second main switch to be in a closed state;
detecting a voltage between both ends of a third switch in an open state, the third switch being connected between a positive terminal of the corresponding battery module and the first main switch; and
detecting the second short-circuit between the corresponding battery control unit and the first and second main switches according to the detected voltage between both ends of the third switch.

10. The short-circuit detection method as claimed in claim 9, further comprising:
while controlling the first and second main switches to be in the closed state, detecting, by the main controller, an actual open/closed state of the first and second main switches, and determining, by the main controller, that the first main switch or the second main switch is in a failure state when the detected actual open/closed state of the first main switch or the second main switch indicates an open state; and
when the first main switch or the second main switch is in the failure state, controlling, by the main controller, the first and second main switches to be in an open state.

11. The short-circuit detection method as claimed in claim 10, wherein the detecting of the voltage between the first and second ends of the first switch and the detecting of the first short-circuit are both performed when the first and second main switches are in a normal state.

12. The short-circuit detection method as claimed in claim 9, further comprising, when the first short-circuit is detected:
   controlling the first and second main switches to be in an open state; and
   controlling the second switch to be in an open state.

13. The short-circuit detection method as claimed in-claim 9, wherein the detecting of the voltage between the first and second ends of the first switch and the detecting of the first short-circuit are performed when the second short-circuit is not detected for all of the plurality of battery control units.

14. The short-circuit detection method as claimed in claim 9, wherein the first short-circuit is a short-circuit between the first and second main switches and the external load.

* * * * *